(12) United States Patent
Jabbar et al.

(10) Patent No.: US 12,335,104 B2
(45) Date of Patent: *Jun. 17, 2025

(54) METHOD AND SYSTEM FOR GENERATING A TIME-SENSITIVE NETWORK CONFIGURATION

(71) Applicant: GE Aviation Systems LLC, Grand Rapids, MI (US)

(72) Inventors: Abdul Jabbar, Altamont, NY (US); Stephen Francis Bush, Latham, NY (US); Thomas Stephen Markham, Schenectady, NY (US)

(73) Assignee: GE AVIATION SYSTEMS LLC, Grand Rapids, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/448,270

(22) Filed: Aug. 11, 2023

(65) Prior Publication Data
US 2023/0388193 A1 Nov. 30, 2023

Related U.S. Application Data

(63) Continuation of application No. 17/100,356, filed on Nov. 20, 2020, now Pat. No. 11,736,359.

(51) Int. Cl.
*H04L 12/28* (2006.01)
*H04L 41/12* (2022.01)
(Continued)

(52) U.S. Cl.
CPC .............. *H04L 41/12* (2013.01); *H04L 47/28* (2013.01); *H04L 67/62* (2022.05)

(58) Field of Classification Search
CPC ......... H04L 41/12; H04L 47/28; H04L 67/62; H04L 41/0816; H04L 47/722;
(Continued)

(56) References Cited

U.S. PATENT DOCUMENTS 10,075,378 B2  9/2018  Bai
10,218,628 B2  2/2019  Bush
(Continued)

FOREIGN PATENT DOCUMENTS

CN   110650167 B   2/2021
CN   111740924 B   3/2022
(Continued)

OTHER PUBLICATIONS

A.C.T. d. Santos, B. Schneider and V. Nigam, "TSNSCHED: Automated Schedule Generation for Time Sensitive Networking," Nov. 11, 2019, IEEE, 2019 Formal Methods in Computer Aided Design (FMCAD), pp. 69-77, doi: 10.23919/FMCAD.2019.889424. (Year: 2019).*

(Continued)

*Primary Examiner* — Phuongchau Ba Nguyen
(74) *Attorney, Agent, or Firm* — McGarry Bair PC

(57) ABSTRACT

A system and method for generating a time-sensitive network schedule for a desired TSN includes defining a network topology of the desired TSN including at least a set of end nodes communicative connected by way of a set of switching nodes, defining a set of device parameters for each of the set of end nodes and each of the set of switching nodes of the desired TSN, determining, by a TSN scheduler, a TSN schedule for the desired TSN based on the defined network topology and the defined set of device parameters for each of the set of end nodes and each of the set of switching nodes, and generating a per-device configuration for each of the set of end nodes and each of the set of switching nodes of the desired TSN, based on the determined TSN schedule.

11 Claims, 3 Drawing Sheets

(51) Int. Cl.
*H04L 47/28* (2022.01)
*H04L 67/62* (2022.01)

(58) Field of Classification Search
CPC ..... H04L 47/724; H04L 45/02; H04L 47/781; H04L 45/38; H04L 41/145; H04L 67/12; H04L 45/00; H04L 45/04; Y04S 40/00; H04W 84/18
See application file for complete search history.

(56) References Cited

U.S. PATENT DOCUMENTS

| | | | |
|---|---|---|---|
| 10,754,816 | B2 | 8/2020 | Kasichainula |
| 10,805,222 | B2* | 10/2020 | Frangieh ............... H04L 67/34 |
| 11,411,891 | B2* | 8/2022 | Bush ...................... H04L 47/521 |
| 11,736,359 | B2* | 8/2023 | Jabbar ..................... H04L 45/02 370/254 |
| 2018/0006956 | A1 | 1/2018 | Bush et al. |
| 2018/0063020 | A1 | 3/2018 | Bhagavatula et al. |
| 2018/0316557 | A1 | 11/2018 | Frangieh et al. |
| 2019/0104055 | A1 | 4/2019 | Craciunas et al. |
| 2019/0245792 | A1 | 8/2019 | Bush et al. |
| 2019/0253339 | A1 | 8/2019 | Mehmedagic |
| 2020/0083978 | A1 | 3/2020 | Bush et al. |
| 2020/0213235 | A1 | 7/2020 | Templier et al. |
| 2020/0267785 | A1* | 8/2020 | Talebi Fard ........... H04L 45/04 |
| 2020/0280522 | A1 | 9/2020 | Frangieh et al. |
| 2021/0092792 | A1 | 3/2021 | Li et al. |
| 2021/0204172 | A1 | 7/2021 | Rost et al. |
| 2021/0226902 | A1* | 7/2021 | Li ......................... H04L 41/0806 |
| 2021/0274375 | A1* | 9/2021 | Li ......................... H04W 28/10 |
| 2021/0306901 | A1 | 9/2021 | Mannweiler et al. |

FOREIGN PATENT DOCUMENTS

| | | |
|---|---|---|
| CN | 114268550 A | 4/2022 |
| CN | 115086239 B | 11/2022 |
| WO | 2018162071 A1 | 9/2018 |
| WO | WO-2020088745 A1 * | 5/2020 ............. H04L 47/28 |
| WO | 2022201605 A1 | 9/2022 |

OTHER PUBLICATIONS

Miranda Jr et al, Time-Sensitive Networking Experimental on Open Testbeds, IEEE, May 2-5, 2022, pp. 1-6 (Year: 2022).

Alnajim et al, Incremental Path-Selection and Scheduling for Time-Sensitive Networks, IEEE, Dec. 9-13, 2019, pp. 1-6 (Year: 2019).

5G-ACIA White Paper, Integration of 5G with Time-Sensitive Networking for Industrial Communications, ZVEI—German Electrical Electronic Manufacturers' Association, 5G Alliance for Connected Industries and Automation (5G-ACIA), a Working Party of ZVEI, www.zvei.org, Feb. 2021, pp. 1-25 (Year: 2021).

Cisco, Time-Sensitive Networking: A Technical Introduction, 2017, Cisco Public, WhitePaper, pp. 1-8. (Year: 2017).

Li et al, A Simple and Efficient Time-Sensitive Networking Traffic Scheduling Method for Industrial Scenarios, MDPI—Electronics, Dec. 12, 2020, pp. 1-19, (Year: 2020).

Albert Bergstrom, Automatic Generation of Network Configuration in Simulated Time Sensitive Networking (TSN) Applications, retrieved from http://mdh.diva-portal.org/smash/get/diva2:1438082/FULLTEXT01.pdf, pp. 1-45, Vasteras, Sweden.

Pahlevan Maryan et al., "Evaluation of TSN Dynamic Configuration Model for Safely-Critical Application", Dec. 16, 2019, pp. 566-571, Siegen, Germany.

Vlk Marek et al: "Enhancing Schedulability and Throughput of Time•Triggered Traffic in IEEE 802.1 Qbv Time-Sensitive Networks", IEEE Transactions on Communications, IEEE Service Center, Piscataway, NJ. USA, vol. 68, No. 11, Nov. 2020, pp. 7023-7038.

Qualcomm Incorporated: "Considerations for soft buffer management", 3GPP TSG-RAN WG1 Nr Ad-Hoc #2 R1-1711207 Jun. 27-30, 2017, Qingdao, P.R. (9 pages).

* cited by examiner

METHOD AND SYSTEM FOR GENERATING A TIME-SENSITIVE NETWORK CONFIGURATION

CROSS-REFERENCE TO RELATED APPLICATIONS

This application is a continuation of U.S. patent application Ser. No. 17/100,356, filed Nov. 20, 2020, now U.S. Pat. No. 11,736,359, issued Aug. 22, 2023, the disclosure of which is hereby incorporated by reference in its entirety as though fully set forth herein.

TECHNICAL FIELD

This disclosure relates generally to a method and system for generating a time sensitive network configuration, and more specifically to systems and methods for scheduling data flows in a time-sensitive network.

BACKGROUND

Various types of control systems communicate data between different sensors, devices, and user interfaces, etc., to enable control operations of other powered systems. For example, aircraft, locomotives, automobiles, surgical suites, power plants, etc., include many systems that communicate with each other using Industrial Ethernet networks in order to control operations of the aircraft, locomotives, automobiles, surgical suites, and power plants.

Industrial Ethernet networks are based on layer-2 (Ethernet), but add proprietary protocols to achieve real-time communication. Some systems can use a time-sensitive network (TSN) to communicate data using standard methods for time synchronization and traffic management, allowing deterministic communication over standard Ethernet networks between end-devices. The IEEE 802.1 TSN specification suite standardizes layer-2 communication for networking protocols providing deterministic communication while sharing the same infrastructure. For example, a number of standards to establish various technological paradigms—clock synchronization (802.1AS-2020), frame preemption (802.1Qbu), scheduled traffic (802.1Qbv), and redundancy management (802.1CB). These must work together at the Ethernet layer-2 to ensure that critical control and safety functions are executed while meeting their respective deadlines and constraints. The 802.1Qbv TSN standard provides scheduled transmissions for mission and safety-critical data frames in a predetermined manner.

As TSNs include more complex topologies, with redundant or dynamically changing links and large numbers of devices, the scheduling of the communication flows between the devices becomes increasingly more complex and time consuming.

BRIEF DESCRIPTION

In one aspect, the present disclosure relates to a method of generating a time-sensitive network (TSN) schedule for a desired TSN, including defining a network topology of the desired TSN including at least a set of end nodes communicatively connected by way of a set of switching nodes, defining a set of device parameters for each of the set of end nodes and each of the set of switching nodes of the desired TSN, determining, by a TSN scheduler, a TSN schedule for the desired TSN based on the defined network topology and at least a subset of the defined set of device parameters for each of the set of end nodes and each of the set of switching nodes, and generating a per-device configuration for each of the set of end nodes and each of the set of switching nodes of the desired TSN, based on the determined TSN schedule.

In another aspect, the present disclosure relates to a system for generating a time-sensitive network (TSN) schedule for a desired TSN, the system including a set of topology input data, stored in memory, defining an arrangement of the desired TSN including at least a set of end nodes communicative connected by way of a set of switching nodes, a set of data flow input data, stored in memory, defining communication pathways between the set of end nodes by way of the set of switching nodes, a set of device parameter input data, stored in memory, for each of the set of end nodes and each of the set of switching nodes of the desired TSN, and a TSN scheduler. The TSN scheduler is further configured to determine a TSN schedule for the desired TSN based on the set of topology input data, the set of data flow input data, and the set of device parameter input data, for each of the set of end nodes and each of the set of switching nodes, and generate a per-device configuration for each of the set of end nodes and each of the set of switching nodes of the desired TSN, based on the determined TSN schedule. Each of the set of end nodes and each of the set of switching nodes of the desired TSN are operable in accordance with the respective per-device configuration.

These and other features, aspects and advantages of the present disclosure will become better understood with reference to the following description and appended claims. The accompanying drawings, which are incorporated in and constitute a part of this specification, illustrate aspects of the disclosure and, together with the description, serve to explain the principles of the disclosure.

BRIEF DESCRIPTION OF THE DRAWINGS

A full and enabling disclosure of the present description, including the best mode thereof, directed to one of ordinary skill in the art, is set forth in the specification, which refers to the appended figures, in which.

DETAILED DESCRIPTION

Figure 1:
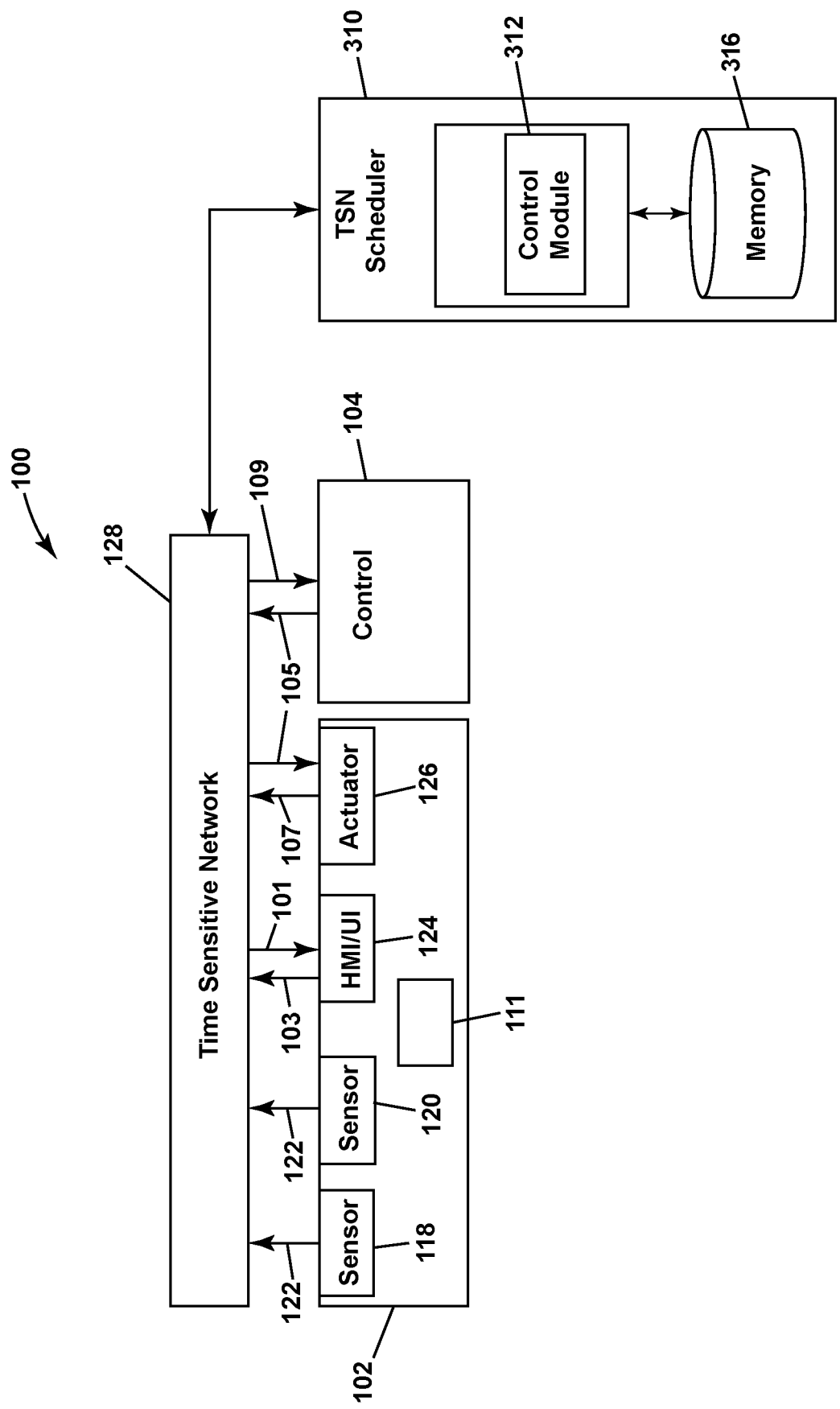
FIG. 1 illustrates a schematic diagram of a system in accordance with aspects as described herein.

The exemplary drawings are for purposes of illustration only and the dimensions, positions, order and relative sizes reflected in the drawings attached hereto can vary.

As used herein, the term "set" or "subset" of elements can be any number of elements, including only one. Additionally, connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. In non-limiting examples, connections or disconnections can be selectively configured to provide, enable, disable, or the like, an electrical connection or communicative connection between respective elements.

As used herein, a "controller" or "controller module" can include a component configured or adapted to provide instruction, control, operation, or any form of communication for operable components to affect the operation thereof. A controller module can include any known processor, microcontroller, or logic device, including, but not limited to: field programmable gate arrays (FPGA), an application specific integrated circuit (ASIC), a full authority digital engine control (FADEC), an aviation system, a proportional controller (P), a proportional integral controller (PI), a proportional derivative controller (PD), a proportional integral derivative controller (PID controller), a hardware-accelerated logic controller (e.g. for encoding, decoding, transcoding, etc.), the like, or a combination thereof. Non-limiting examples of a controller module can be configured or adapted to run, operate, or otherwise execute program code to effect operational or functional outcomes, including carrying out various methods, functionality, processing tasks, calculations, comparisons, sensing or measuring of values, or the like, to enable or achieve the technical operations or operations described herein. The operation or functional outcomes can be based on one or more inputs, stored data values, sensed or measured values, true or false indications, or the like. Non-limiting examples of operable or executable instruction sets can include routines, programs, objects, components, data structures, algorithms, etc., that have the technical effect of performing particular tasks or implement particular abstract data types. In another non-limiting example, a controller module can also include a data storage component accessible by the processor, including memory, whether transient, volatile or non-transient, or non-volatile memory.

Additional non-limiting examples of the memory can include Random Access Memory (RAM), Read-Only Memory (ROM), flash memory, or one or more different types of portable electronic memory, such as discs, DVDs, CD-ROMs, flash drives, universal serial bus (USB) drives, the like, or any suitable combination of these types of memory. In one example, the program code can be stored within the memory in a machine-readable format accessible by the processor. Additionally, the memory can store various data, data types, sensed or measured data values, inputs, generated or processed data, or the like, accessible by the processor in providing instruction, control, or operation to affect a functional or operable outcome, as described herein. In another non-limiting example, a control module can include comparing a first value with a second value, and operating or controlling operations of additional components based on the satisfying of that comparison. For example, when a sensed, measured, or provided value is compared with another value, including a stored or predetermined value, the satisfaction of that comparison can result in actions, functions, or operations controllable by the controller module. As used, the term "satisfies" or "satisfaction" of the comparison is used herein to mean that the first value satisfies the second value, such as being equal to or less than the second value, or being within the value range of the second value. It will be understood that such a determination can easily be altered to be satisfied by a positive/negative comparison or a true/false comparison. Example comparisons can include comparing a sensed or measured value to a threshold value or threshold value range.

Aspects of the disclosure can be implemented in any environment, apparatus, system, or method having a regulated, restricted, authorized, or otherwise limited "write-access" privileges to a memory or data store component. As used herein, "write-access" means availability or authorization to commit a change to a memory, the change being storing or overwriting data, values, commands, instructions, or any other data, element, or identifier to a memory location, regardless of the function performed by the data, element, or identifier, or regardless of the function or implementation of the environment, apparatus, system, or method. Collectively, "access" to data or "accessing" data can refer to either reading, viewing, or otherwise receiving data from a data store, "writing" data, as referenced above, or a combination thereof.

As used herein, a "topology" can refer to one or more arrangement(s) of a network which can include a plurality of nodes (e.g., sender devices, receiver devices, switches, or bridges) and connecting lines (e.g., communication links, or "hops" including wired communication links or wireless communication links) between the nodes in the network. Each link can communicatively couple a corresponding pair of nodes. A set of links can be coupled in sequence via their respective nodes to define a link path, for example between an originating node and a destination node. Topologies may comprise, but are not limited to, one or more of mesh, star, bus, ring, and tree topologies.

As used herein, the term "installed product" should be understood to include any sort of mechanically operational entity, asset including, but not limited to, aircraft, jet engines, locomotives, gas turbines, and wind farms and their auxiliary systems as incorporated. The term is most usefully applied to large complex powered systems with many moving parts, numerous sensors and controls installed in the system. The term "installed" includes integration into physical operations, for example, such as the use of engines in an aircraft fleet whose operations are dynamically controlled, a locomotive in connection with railroad operations, or apparatus construction in, or as part of, an operating plant building, machines in a factory or supply chain, or the like. As used herein, the terms "installed product," and "powered system" can be used interchangeably. As used herein, the term "automatically" can refer to, for example, actions that can be performed with little or no human interaction.

The TSN standards suite consists of a number of standards and sub-standards that establish technological protocols for communication networks, for example, clock synchronization (802.1AS-2020), frame preemption (802.1Qbu), scheduled traffic (802.1Qbv), and redundancy management (802.1CB). These protocols cooperate at the Ethernet layer-2 to ensure that safety and compliance with their respective parameters and constraints. For example, the 802.1Qbv TSN standard provides scheduled transmissions for safety-critical data frames in a predetermined manner, and is incorporated herein in its entirety. As used herein, "TSN schema" can refer, without limitation, to networks, components, elements, units, nodes, hubs, switches, controls, modules, pathways, data, data frames, traffic, protocols, operations, transmissions, and combinations thereof, that adhere to, are configured for, or are compliant with, one or more of IEEE 802.1 TSN standards.

The 802.1Qbv TSN standard addresses the transmission of critical and non-critical data traffic within a TSN. Critical data traffic is guaranteed for delivery at a scheduled time while non-critical data traffic is usually given lower priority.

Various traffic classes have been established according to IEEE 802 1Q that are used to prioritize different types of data traffic.

To achieve desired levels of reliability, TSNs employ time synchronization, and time-aware data traffic shaping. The data traffic shaping uses the schedule to control gating of transmissions on the network switches and bridges (e.g., nodes).

In some aspects, the schedules for such data traffic in TSNs can be determined prior to operation of the network. In other aspects, the schedules for data traffic can be determined during an initial design phase based on system requirements, and updated as desired. For example, in addition to defining a TSN topology (including communication paths, bandwidth reservations, and various other parameters), a networkwide synchronized time for data transmission can be predefined. Such a plan for data transmission on communication paths of the network is typically referred to as a "communication schedule" or simply "schedule". As will be disclosed in more detail herein, the schedule for data traffic on a TSN can be determined for a specific data packet over a specific path, at a specific time, for a specific duration.

Time-critical communication between end devices or nodes in TSNs commonly includes "TSN flows" also known as "data flows" or simply, "flows." For example, data flows can comprise datagrams, such as data packets or data frames. Each data flow is unidirectional, going from a first originating or source end device to a second destination end device in a system, having a unique identification and time requirement. These source devices and destination devices are commonly referred to as "talkers" and "listeners." Specifically, the "talkers" and "listeners" are the sources and destinations, respectively, of the data flows, and each data flow is uniquely identified by the end devices operating in the system. It will be understood that for a given network topology comprising a plurality of interconnected devices, a set of data flows between the interconnected devices or nodes can be defined. For example, the set of data flows can be between the interconnected devices. For the set of data flows, various subsets or permutations of the dataflows can additionally be defined.

Both end devices and Ethernet switches (commonly called "bridges" or "switching nodes") transmit and receive the data (in one non-limiting example, Ethernet frames) in a data flow based on a predetermined time schedule. The switching nodes and end devices must be time-synchronized to ensure the predetermined time schedule for the data flow is followed correctly throughout the network. In some other aspects, only the Ethernet switches can transmit the data based on the pre-determined schedule, while the end devices, for example legacy devices, can transmit data in an unscheduled manner.

The data flows within a TSN can be scheduled using a single device that assumes fixed, non-changing paths through the network between the talker/listener devices and switching nodes in the network. Alternatively, the data flows can be scheduled using a set of devices or modules. The scheduling devices, whether a single device or a set of devices, can be arranged to define a centralized scheduler. In still other aspects, the scheduler devices can comprise a distributed arrangement. The TSN can also receive non-time sensitive communications, such as rate-constrained communications. In one non-limiting example, the scheduling devices can include an offline scheduling system or module.

FIG. 1 illustrates a block diagram of a system 100 architecture in accordance with some aspects. The system 100 can include a TSN 128 and at least one installed product 102. The system 100 can include at least one planned, designed, configured, or desired TSN product (hereafter, "TSN product" 102).). In another non-limiting example of aspects of the disclosure, the TSN product can include an installed product, that is, an in-situ system. As noted above, the installed product 102 can be, in various aspects, a complex mechanical entity such as the production line of a factory, a gas-fired electrical generating plant, avionics data bus on an aircraft, a jet engine on an aircraft amongst a fleet (e.g., two or more aircraft), a digital backbone in an aircraft, an avionics system, mission or flight network, a wind farm, a locomotive, etc.

In various aspects, the installed product 102 can include any number of end devices, such as sensors 118, 120, a user platform device 24 such as a human machine interface (HMI) or user interface (UI) 124, and one or more actuators 126. As used herein, the term "actuator" can broadly refer to devices, components, modules, equipment, machinery, or the like that function to perform tasks or operations associated with operation of the installed product 102. In aspects, the installed product 102 can further include one or more software applications 111.

The TSN product 102 can further comprise a control system 104 that controls operations of the TSN product 102 based on data obtained or generated by, or communicated among devices of the installed product 102 to allow for automated control of the TSN product 102 and provide information to operators or users of the TSN product 102. The control system 104 can define or determine the data flows and data flow characteristics in the network.

In non-limiting aspects, the system 100 can comprise a network scheduler or TSN Scheduler 310. In such aspects, the TSN Scheduler 310 can define or determine a schedule by which all TSN data frames are transmitted. In some aspects, the TSN scheduler 310 can be communicatively coupled to the TSN 128. In other aspects, the TSN Scheduler 310 can comprise a separate or stand-alone TSN Scheduler 310 that is not communicatively coupled to the TSN 128. In such aspects, the schedule created by the TSN Scheduler 310 can be communicated or provided to the TSN 128 by other loading protocols (e.g. ARINC615), other formats, (e.g. ARINC665), or by manual entry or loading of data. In another aspect, the TSN Scheduler 310 may be combined with or incorporated by another component in the system 100. For example, in non-limiting aspects, the control system 104 can include the TSN Scheduler 310.

In some aspects, the TSN Scheduler 310 can include a memory 316 or a computer data store and one or more processor or processing modules, shown as a controller module 312 (e.g., microprocessors, integrated circuits, field programmable gate arrays, etc.) that perform operations to determine the schedule for the transmission of TSN data frames. The controller module 312 can, for example, be a conventional microprocessor, and can operate to control the overall functioning of the TSN Scheduler 310. The memory 316 can provide information to the controller module 312 and can store results or information from the controller module 312. The memory 316 can comprise any combination of one or more of a hard disk drive, RAM (random access memory), ROM (read-only memory), flash memory, etc. The memory 316 can store software that programs the controller module 312 to perform functionality as described herein.

The controller module 312, according to some aspects, can access the memory 316 to create a prediction or result (e.g., a predicted schedule or data flow) that can be transmitted back to the TSN product 102 as appropriate (e.g., for display to a user, operation of the installed product, operation of another system, or input to another system).

The TSN 128 can supply data (e.g., via a data flow) from at least one TSN product 102 to the TSN Scheduler 310. The data can include information related to the data flows associated with the TSN 128. The TSN Scheduler 310 is configured to calculate, generate, or otherwise determine a schedule for the transmission of each data flow through the TSN 128. For example, in an aspect, the TSN Scheduler 310 can receive information associated with one or more data flows and determine a classification for each data flow. Based on the classification, the TSN Scheduler 310, in one or more aspects, can determine a schedule for the transmission of each data flow through the TSN 128. The control system 104 can operatively control one or more operations of the TSM product 102 based on the transmitted data or data frame(s).

In some aspects, the TSN 128 can supply output from the network TSN Scheduler 310 to at least one of user platforms such as HMI/UI 124, to the TSN product 102, to other systems or a combination thereof. In some aspects, signals or data received by the HMI/UI 124, TSN product 102 and other systems can modify the state or condition or another attribute of one or more physical elements or end devices of the TSN product 102.

The HMI/UI 124 can communicate via the TSN 128. For example, the HMI/UI 124 can receive data 101 that is to be presented to a user or operator TSN 128, TSN Scheduler 310, or control system 104 and that can communicate data 103 received from the user or operator to one or more other devices of the control system 104. The HMI/UI 124 can comprise a display device, a touchscreen, laptop, tablet computer, mobile phone, speaker, haptic device, or other device that communicates or conveys information to a user or operator.

In aspects, the sensors 118, 120 can comprise any conventional sensor or transducer. For example, in an aspect, at least one of the sensors 118, 120 can comprise a camera that generates video or image data, an x-ray detector, an acoustic pick-up device, a tachometer, a global positioning system receiver, a wireless device that transmits a wireless signal and detects reflections of the wireless signal in order to generate image data, or another device.

The one or more actuators 126, (e.g., devices, equipment, or machinery that move to perform one or more operations of the installed product 102 that is controlled by the control system 104) can communicate using the TSN 128. Non-limiting examples of actuators 126 include brakes, throttles, robotic devices, medical imaging devices, lights, turbines, etc. The actuators 126 can communicate status data 107 of the actuators 126 to one or more other devices of the installed product 102 via the TSN 128. The status data 107 can represent a position, state, health, or the like, of the actuator 126 sending the status data 107. The actuators 126 can receive command data 105 from one or more other devices of the installed product or control system via the TSN 128. The command data 105 can represent instructions that direct the actuators 126 how or when to move, operate, etc.

The control system 104 can communicate a variety of data between or among the end devices via the TSN 128 in response to the one or more software applications 111. For example, the control system 104 can communicate the command data 105 to one or more of the devices or receive data 109, such as status data 107 or sensor data 122, from one or more of the devices.

For example, in non-limiting aspects, the TSN 128 can communicate data between or among the devices and control system 104 using a data distribution service (not shown). As will be understood, the data distribution service can be a network "middleware" application resident for example within the devices 118, 120, 124, and 126, and control system 104 that facilitates configuring publishers and subscribers on a network. In other aspects, other middleware applications can be used. In still other aspects, the data distribution service can be omitted, and the one or more software applications 111 can manage the TSN product 102 (and its devices) without use of the data distribution service.

The data distribution service can represent an object management group (OMG) device-to-device middleware communication standard between the devices and the network. The data distribution service can allow communication between publishers and subscribers. The term publisher can refer to devices 118, 120, 124, and 126 that send data to other devices 118, 120, 124, 126 and the term subscriber refers to devices 118, 120, 124, and 126 that receive data from other devices 118, 120, 124, and 126. The data distribution service can operate on a variety of networks, such as Ethernet networks as one non-limiting example. The data distribution service can operate between the network through which data is communicated and the applications communicating the data (e.g., the devices 118, 120, 124, and 126). The devices 118, 120, 124, and 126 can publish and subscribe to data over a distributed area to permit a wide variety of information to be shared among the devices 118, 120, 124, and 126.

In one aspect, the data distribution service can be used by the devices 118, 120, 124, and 126 to communicate data 101, 103, 105, 107, 109, 122 through the TSN 128, which can operate on an Ethernet network of the installed product. The TSN 128 can be at least partially defined by a set of standards developed by the Time Sensitive Networking Task Group, and can include one or more of the IEEE 802.1 standards.

A TSN-based deterministic network, including but not limited to an Ethernet network, can dictate (i.e., schedule) when certain data communications occur to ensure that certain data frames or packets are communicated within designated time periods or at designated times. Data transmissions within such TSN-based Ethernet networks can be based on a global time or time scale of the network that can be the same for the devices in, or connected with, the network, with the times or time slots in which the devices communicate being scheduled for at least some of the devices.

For ease of description and understanding, the TSN 128 is depicted in FIG. 1 and described as a local area Ethernet network, but alternatively can be another type of network. For example, devices, including those associated with the system 100 and any other devices described herein, can exchange information via any TSN 128 which can be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a Wireless LAN network ("WLAN"), a cellular network (e.g. 5G network), or an Internet Protocol ("IP") network such as the Internet, an intranet, or an extranet. It is contemplated that any devices described herein can communicate via one or more such communication networks.

In various non-limiting aspects, the TSN 128 can include various types of physical media including copper, optical fiber, wires including Wi-Fi and 5G-RAN, and wave guide acoustical channels among many others.

In various aspects, the devices 118, 120, 124, 126 can communicate the data 122, 103, 101, 107, 105, 109 using the time sensitive network 128. As will be discussed in more detail herein, the TSN 128 can include communication links (not shown) communicatively coupling node devices. For example, in one non-limiting aspect, the devices 118, 120, 124, 126 can be the end node devices. In another non-limiting aspect, the TSN 128 can be configured to include the devices 118, 120, 124, 126 (e.g., communicatively coupled with each other via the communication links. The communication links are connections over or through which data flows, data packets, frames, datagrams or a combination thereof can be communicated between the node devices. The communication links can be wired or wireless connections between the node devices.

In aspects, the node devices can include routers, switches, repeaters, or other devices capable of receiving data frames or packets or sending the data frames or packets to another node device, or both. The data can be communicated in the TSN 128 as data frames or data packets. The data frames or packets can be published by a node device 118, 120, 124, 126 and received by another device 118, 120, 124, 126 according to a network or communication schedule. For example, one or more of the data frames or data packets can be published by the sensor 118 and sent to the TSN 128 can be subscribed to by the control system 104. The data frames or packets be transmitted as a data flow along a data transmission path defined by the communication links, from the sensor 118 to the control system 104 to the various node devices in accordance with the determined schedule.

Figure 2:
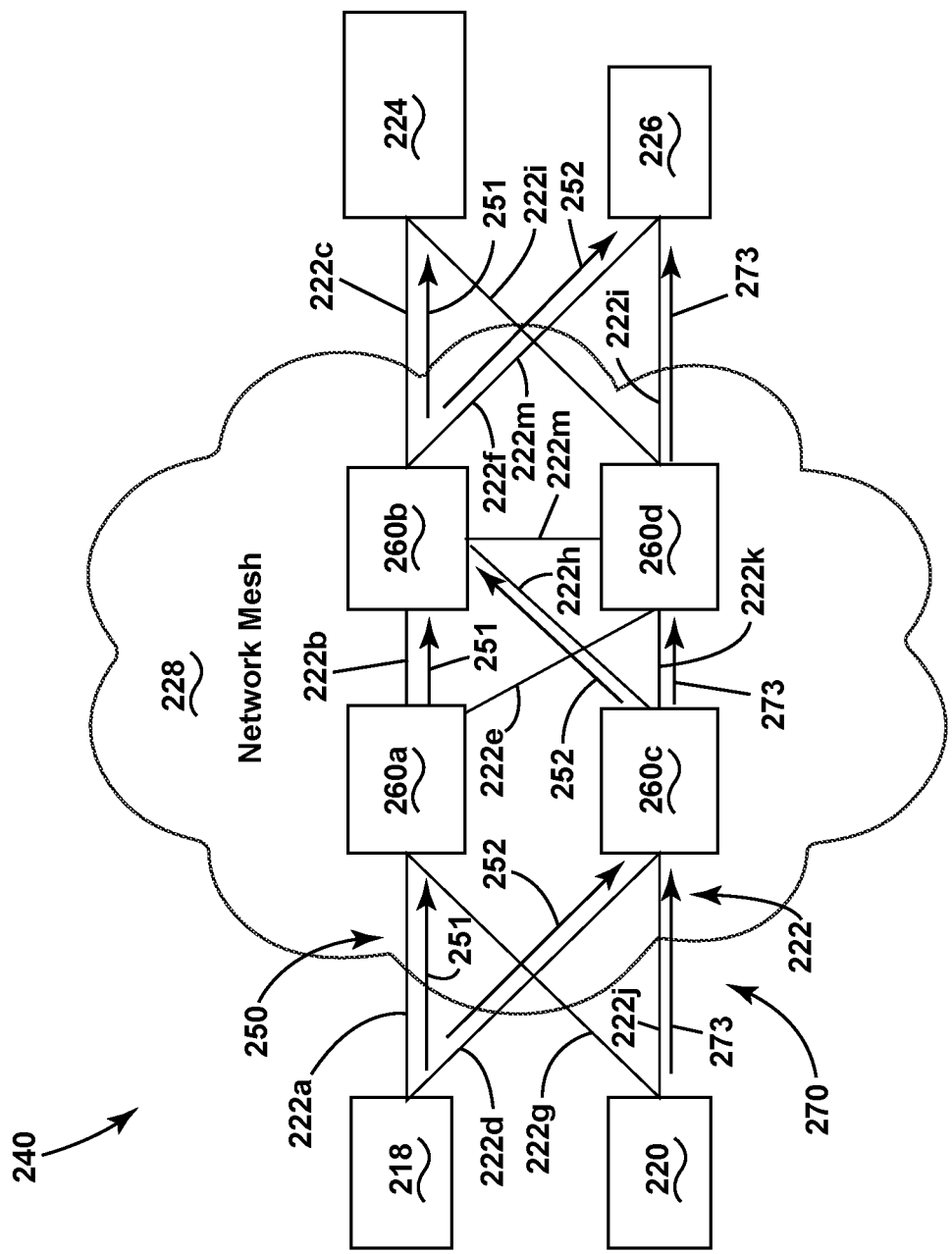
FIG. 2 illustrates a schematic diagram of a data network, having a set of data flows in accordance with aspects as described herein.

FIG. 2 illustrates a non-limiting schematic view of a simple data network 240, for the TSN network 128 of FIG. 1, according to aspects of the disclosure. The data network 240 can include, but is not limited to, a set of devices or end nodes 218, 220, 224, 226, a set of network switching units or switching nodes 260 comprising respective switching nodes 260a, 260b, 260c, 260d, and a set of data transmission lines or links 222 comprising a number of respective links 222a-222m. The set of switching nodes 260 and the set of links 222 collectively define a network structure 228 for transmitting or routing data traffic (e.g., data frames) in data flows to and from the end nodes 218, 220, 224, 226, via the set of links 222 and the set of switching nodes 260. In aspects, the network structure 228 can include multiple links 222 between the network switching nodes 260 to provide redundancy in the links 222.

In non-limiting aspects, the data network 240 can enable a first data stream 250, and a second data stream 270. The first data stream 250 can comprise a first set of data flows 251, and a second set of data flows 252. The second data stream 270 can comprise a third set of data flows 273. The first, second, and third sets of data flows 251, 252, 273 can be scheduled to flow from a respective originating end node 201 to a respective destination end node 202 along a path defined by a respective subset of the set of links 222. In non-limiting aspects, each of the end nodes 218, 220 224, 226 can comprise the originating end node 201, or the destination end node 202, or a combination thereof. In aspects, the switching nodes 260a-260d can comprise routers, switches, bridges, repeaters, or other devices, or combinations thereof, capable of sending or receiving data to another node device, such as an end node 218, 220, 224, 226 or another switching node 260a-260d. The set of links 222 can comprise wired or wireless connections between the end nodes 218, 220, 224, 226 or switching nodes 260a-260d or combinations thereof. In one non-limiting example, the network structure 228, the set of switching nodes 260a-d, the end nodes 218, 220, 224, 226, and the set of links 222 can be arranged, configured, or otherwise enabled to utilize a TSN-based transmission schema.

Each node of the set of switching nodes 260a-d and the end nodes 218, 220, 224, 226, can be communicatively coupled with at least one of another switching node 260a-260d or end node 218, 220, 224, 226, via at least one link 222a-222m. That is, in aspects, each link 222 can communicatively couple a corresponding pair of nodes 218, 220, 224, 226, 260a-260d. Additionally, or alternatively, any number of the switching nodes 260a-260d can be communicatively coupled with at least one of an end node 218, 220, 224, 226 via one or more links 222a-222m. For example, as shown in the non-limiting aspect of FIG. 2, switching node 260a can be coupled to end nodes 218 and 220 via links 222a and 222j, respectively, and is further coupled to switching nodes 260b and 260d via links 222b and 222e, respectively. In this way, each end node 218, 220, 224, 226 can be communicatively coupled with at least one other end node 218, 220, 224, 226 via the set of links 222 and set of switching nodes 260.

For example, in the non-limiting aspect depicted in FIG. 2, the first set of data flows 251 is depicted as a first set of arrows indicative of a respective direction, arranged sequentially (from left to right in the Figure) to indicate a flow from an originating end node 201 (e.g., the end node 218) to a destination end node 202 (e.g., the end node 224) via a first path 231 defined by a sequential series of links 222a, 222b, 222c and switching nodes 260a, 260b. Additionally, as shown, the second set of data flows 252 is depicted as a second set of arrows 252 indicative of a respective direction, arranged sequentially (from left to right) to indicate a flow from the end node 218 to end node 226 via a second path 232 defined by a sequential series of links 222d, 222h, 222f and switching nodes 260c, 260b. As shown, the third set of data flows 273 is depicted as a third set of arrows 273 indicative of a respective direction, arranged sequentially (from left to right) to indicate a flow from the end node 220 to end node 226 via a third path 233 defined by series of links 222j, 222k, 222l and switching nodes 260c, 260d. The data flows of the first, second, and third sets of data flows 251, 252, 273 can be independently scheduled and transmitted at various respective times. Each data flow 251, 252, 273 of the first, second, and third set of data flows 251, 252, 273 can be scheduled for transmission and subsequently transmitted in accordance with their respective schedules.

It will be understood that while the first second and third sets of data flows 251, 252, 273 in FIG. 2 are depicted, for ease of description and understanding, as transmitted concurrently or simultaneously, such a simultaneous transmission of data flows should not be inferred. It will be appreciated that the aspect of the disclosure illustrated in FIG. 2 is merely one simple representation of the data network 240, and alternative topologies, configurations, organization, and quantities of the end nodes 218, 220, 224, 226, switching nodes 260, and links 222 are envisioned. Additionally, it will be appreciated that the data flows depicted are by way of example only, and aspects can comprise any number of data streams having any number of data flows having any number of paths without departing from the scope of the disclosure herein.

Figure 3:
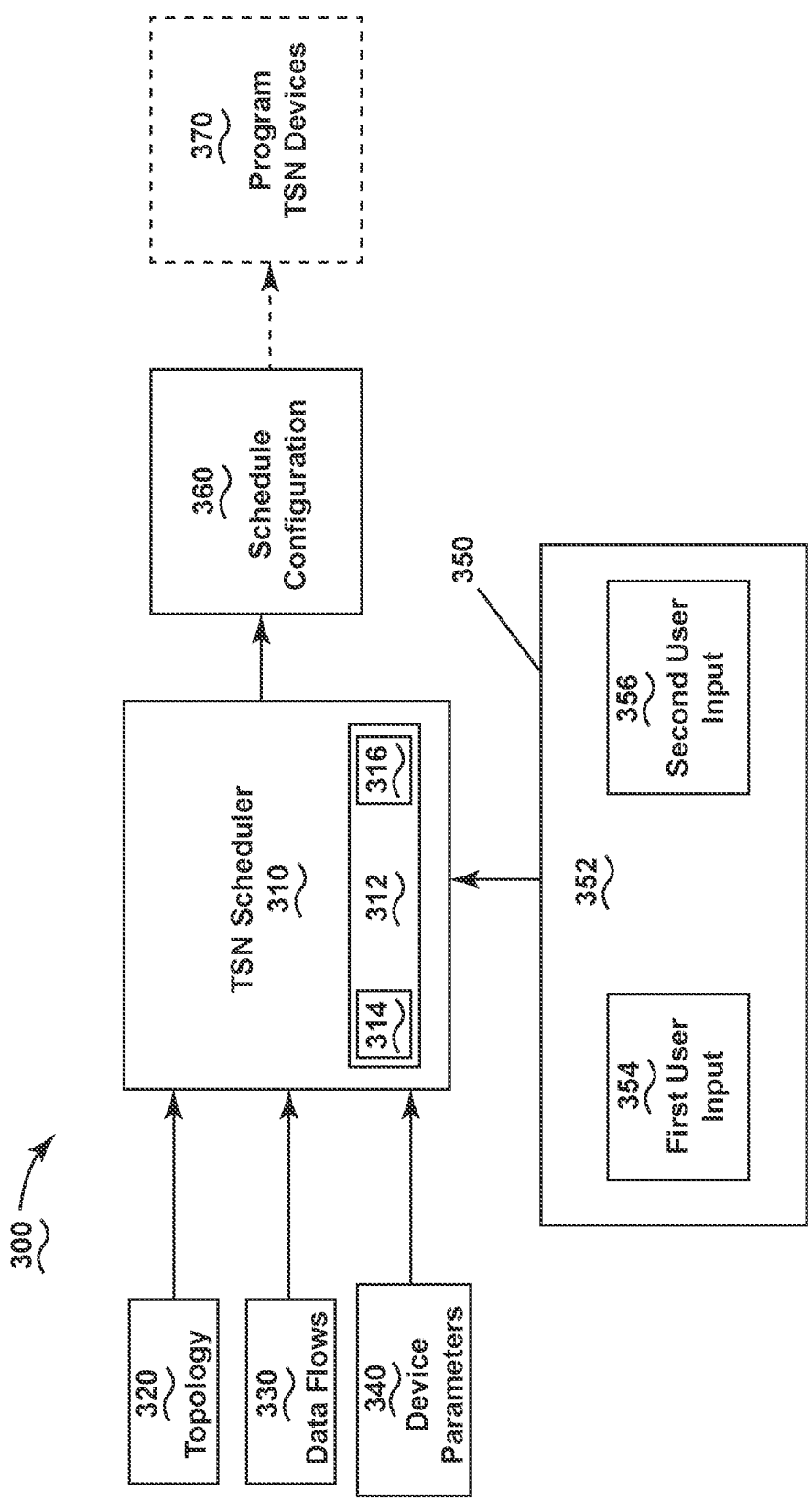
FIG. 3 illustrates a schematic block diagram of a system for generating a TSN schedule configuration for a desired TSN, such as the TSN of FIG. 2, in accordance with aspects as described herein.

FIG. 3 illustrates a non-limiting example of a system 300, and operation thereof, for generating a TSN configuration or a TSN schedule for data transmissions of a one planned, designed, configured, installed, or desired TSN product, including but not limited to the TSN product 102 described and arranged in FIG. 1 and FIG. 2. As shown, a TSN scheduler 310 can include a controller module 312 having a processor 314 and memory 316. The TSN scheduler 310 can further be communicatively connected with and adapted to receive inputs from a topology input 320, a data flow input 330, and a device parameter input 340. The system 300 can also include a user-interactive component, such as a user interface (UI) module 350 having a display 352 and con-figured or capable of receiving user input, shown a first user input 354 and a second user input 356. In response to receiving a set of inputs, the system 300 is configured, enabled, or otherwise adapted to operably generate a TSN configuration or a TSN schedule for a TSN defined by the inputs (hereafter, the "desired TSN"), by way of the TSN scheduler 310.

As used herein, the topology input 320 can include or define a set of topology data, topology configuration, topology information, or the like, that defines the arrangement of the desired TSN, including aspects of the data network 240 of FIG. 2, that is, the set of devices or end nodes 218, 220, 224, 226, the set of network switching units or switching nodes 260 comprising respective switching nodes 260a, 260b, 260c, 260d, and the set of data transmission lines or links 222 comprising a number of respective links 222a-222m. While aspects of FIG. 2 are included, non-limiting aspects of the topology input 320 can include a subset of information, or additional topology-based definitions, of the desired TSN. A set of non-limiting examples of topology input 320 data, parameters, or the like, can include a device attribute, a device identifier (for instance, unique in the desired TSN), a device class (e.g. a "talker" or "listener", an end node, a switching unit, or the like), a network identifier (including but not limited to an Internet Protocol address, a media access control address, or the like), an expected or determined device reliability, a logical port identifier (such as a number of communication ports for the respective device), a physical port name for each defined logical port identifier, and interface port reliability, an indication of time sensitive links, the like, or a combination thereof. Additionally or alternatively, a set of non-limiting examples of topology input 320 data, parameters, or the like, can further include information or parameters associated with the set of communication links 222, for instance, port assignments, link speeds or transmission speed capabilities, delays associated or related to the respective link 222, reliability of the respective link 222, whether the respective link 222 allows for or is enabled for symmetric or asymmetric communication, the like, or a combination thereof.

As used herein, the data flow input 330 can include or define a set of data flows, data streams, transmission pathways (predetermined or otherwise adapted), or the like, to define the desired TSN communication pathways between the set of devices or end nodes 218, 220, 224, 226 (as shown and explained with reference to FIG. 2). A set of non-limiting examples of data flow input 330 data, parameters, or the like, can include a maximum allowable latencies, link bandwidths, data frame sizes ("payload"), data frame destinations, band allocation gaps, the like, or a combination thereof. While aspects of FIG. 2 are included, non-limiting aspects of the data flow input 330 can include a subset of information, or additional transmission-based definitions, of the desired TSN.

As used herein, the device parameter input 340 can include a set of parameters related to, or otherwise associated with the set of devices or end nodes 218, 220, 224, 226, the set of network switching units or switching nodes 260, the set of communication links 222, or the like.

In order to generate feasible TSN schedule and configuration for real-work time sensitive networks, additional device parameter inputs 340 are required in addition to topology input 320 and data flows input 330. As used herein, the device parameter input 340 data, parameters, or the like, can include a set of parameters related to, or otherwise associated with the set of devices or end nodes 218, 220, 224, 226, the set of network switching units or switching nodes 260, the set of communication links 222, or the like. In a non-limiting example, additional device parameter inputs 340 can define a worst case time synchronization error, a worst case gate operation error, a maximum gate control list size, a maximum cycle time, a maximum gate interval duration, a transmission start delay, the like, or a combination thereof. These device parameter inputs 340 can be at least partially utilized to generate a TSN Schedule, configuration, or the like, that is realizable on the hardware of the end nodes and switching nodes. In the absence of such device parameter inputs 340, a TSN scheduler has to take a lowest common denominator approach, wherein all devices are assumed to have the most limiting characteristics resulting in a sub-optimal solution. In this sense, the device parameter inputs 340 enable better scheduling solution in the TSN 128 resulting in improved performance metrics including latency, jitter, packet delay variation, and bandwidth utilization.

In yet another non-limiting example, the set of device parameter inputs 340 can further describe or relate to devices created, programmed by, or otherwise of different operation or manufacturer. In this sense, the set of device parameter inputs 340 can define a set or subset of disparate devices (e.g. heterogenous, as from multiple vendors), as opposed to homogenous or all-similar devices. For example, device parameters inputs 340 can include, but are not limited to, definitions of specific configuration models, error tolerances, hardware limitations, software limitation, and firmware options of each end node and switching node in the network defined by the topology input 320. In this sense, the device parameter inputs 340 enable scheduling and configuration of a heterogenous network comprising of devices from multiple vendors and of varying characteristics.

Another non-limiting example of device parameter input 340 can include the specific TSN features supported by each end node and switching node in the desired TSN. For example, additional device parameter inputs 340 can define if a node supports one or more of time synchronization, time aware shaping, asynchronous shaping, frame replication and elimination for reliability, frame pre-emption, ingress policing, and other TSN features. The device parameter inputs 340 can further define the specific version or variant of the feature or standard supported by end nodes and switching nodes in the network. These device parameter inputs 340 enable scheduling and configuration of a mixed capability network wherein end nodes and switching nodes have varying degree of support (including no support) for the desired TSN features and version.

Further non-limiting examples of device parameter input 340 can include, but is not limited to, additional parameters utilized for programming functionality of the respective device or end node 218, 220, 224, 226, network switching units or switching nodes 260, or the like. For example, additional device parameter inputs 340 can define or enable for the programming of the respective device with a generated or scheduled TSN configuration. Non-limiting examples of the additional device parameter inputs 340 can define or enable for the programming of the respective device can include, but are not limited to, a programming method, a communication protocol, a device login name, a device login password, a device programming port, a device programming file structure or file path for programming data, a device programming file format, a device configuration file format, a device schedule file format, the like, or a combination thereof. In this sense, this set or subset of device parameter inputs 340 defining or enabling for the programming of the respective device with a generated or scheduled TSN configuration (collectively, "programming parameters") and enable or allow for the system 300 to update, install, program, configure, or otherwise modify the set of devices to operate in response to, or in accordance with, a schedule or a configuration for the desired TSN.

Collectively, the topology input 320, the data flow input 330, and the device parameter input 340, or a subset thereof, define the structure, the arrangement, or the physical state(s) or technical characteristic(s) of the desired TSN, for which the TSN scheduler 310 will generate a TSN schedule or a TSN configuration for. In non-limiting examples, operating or operation of the system 300 can be included where at least a subset of the topology input 320, the data flow input 330, and the device parameter input 340 (including individual or unique parameter inputs) can be optional, mandatory, or a combination thereof (for example where a first subset of input 320, 330, 340 is optional while a second subset of input 320, 330, 340 is mandatory).

As used herein, the UI 350 can include interactive components for receiving the user input, shown as the first user input 354 and the second user input 356. The interactive components can include, but are not limited to, voice-interactive components (e.g. voice recognition), touch sensitive displays (including display 352), mouse and keyboard input, the like, a combination thereof, or any other interactive mechanisms. In one non-limiting example, the first user input 354 can include options for instructing the TSN scheduler 310 for performing the scheduling process. For instance, the first user input 354 can include a user input defining whether a contiguous scheduling mode should be utilized. As used herein, a "contiguous scheduling mode" is a scheduling mode by the TSN scheduler 310 that attempts, designs, or otherwise generates a schedule configuration that results in back-to-back scheduling of data flows in the desired TSN. Back-to-back scheduling can allow for or enable higher utilization of the network resources in the desired TSN. Additionally, non-limiting examples of the "contiguous scheduling mode" can further include a data flow timing buffer to ensure no data flow overlap or collisions are scheduled. In one non-limiting example, the first user input 354 defining whether a contiguous scheduling mode should be utilized can be a binary input (either yes or not, true or false, a box "checked" or "unchecked", or the like), or can be best-effort input, wherein the contiguous scheduling mode is attempted, but the operation of the TSN scheduler 310 will not fail if the contiguous scheduling mode cannot be completed (e.g. the TSN scheduler 310 can default to another operation).

In another non-limiting example, the second user input 356 can include options for instructing the TSN scheduler 310 for performing the scheduling process. For example, the second user input 356 can receive a user input providing a starting or initial estimate, guess, impression, suggestion, or the like, provided by a user operating or initiating the TSN scheduler 310. In one non-limiting example, the second user input 356 can include a suggested cycle time for the desired TSN, or the like, whereby the operation of the TSN scheduler 310 can initiate the solving of a schedule configuration for the desired TSN based on the second user input 356. As used herein, initiating the solving of a schedule configuration for the desired TSN based on the second user input 356 can include, but is not limited to, starting with the cycle time value received at the second user input 356, or prioritizing the cycle time value received (or values proximate thereof) at the second user input 356. In additional non-limiting instances, the TSN scheduler 310 can include a default cycle time value in the absence of the user inputting a second user input 356, or can default back to a default cycle time value in the event that the TSN scheduler 310 is unable to generate or create a schedule configuration. Furthermore, the suggested cycle time could be a numerical value or a mathematical formula such as greatest common denominator (GCD) or least common multiple (LCM).

The TSN scheduler 310 can be configured to receive the set of inputs 320, 330, 340, 354, 356, or a subset thereof, and perform a deterministic operation to generate a schedule for the desired TSN. As shown, the generated schedule, generated configuration, or the like, can be represented as a "schedule configuration" 360, as shown. As schematically represented, the schedule configuration 360 can include, but is not limited to, a collective or set of configurations, timings, commands, controls, instructions, the like, or a combination thereof, for operating the desired TSN in accordance with the characteristics of the desired TSN (such as desired operating characteristics, guidelines, processes, procedures, demands, data flows, parameters, inputs 320, 330, 340, 354, 356 or a subset thereof, or the like). In this sense, the "output" of the TSN Scheduler 310 is the set of data or information by which the desired TSN will be operable. In non-limiting examples, the schedule configuration 360 can include one or more data files or configuration files by which the desired TSN components will operate in response to. For example, the schedule configuration 360 can include data or a configuration file for each (or a subset of) the respective device or end node 218, 220, 224, 226, network switching units or switching nodes 260, or the like. In another non-limiting example, the schedule configuration 360 can include data or a configuration file defining each of the data flows 251, 252, 273 of the desired TSN.

In some aspects, the schedule configuration 360 can include a specific transmission information for individual or collective (e.g. "global") data frame transmission for one or more respective nodes. The transmission information can include temporal information for the transmission of the data frame. In one or more aspects, the schedule configuration 360 for a data frame can include a transmission start time. For example, the transmission start time can be the time at which the transmission of the data frame from the respective node initiates. In an aspect, the transmission of the data frame can be initiated by a selective opening of a gate of the respective node to transmit the data frame, as a data flow to a destination node. Conversely, the transmission of the data frame can be ceased or prevented by a selective closing of the gate of the respective node to transmit the data frame. The schedule configuration 360 can also define or assign a specific path or link 222a-m communicatively coupling the respective node and another node to transmit the data flow thereon. The planned or executed transmission of a particular data frame on a specific path or link 222a-m from the respective node to another node at a specific time can define the schedule for a respective data flow 251, 252, 273. Additionally, the schedule configuration 360 can define a duration of the transmission of the respective data flow 251, 252, 273 on the respective link 222a-m. In an aspect, the duration of the data flow 251, 252, 273 transmission on the respective link 222a-m can be defined by a time period between the selective opening of the gate (i.e., to transmit the data frame) and the selective closing of the gate of the respective node (i.e., to cease transmission of the data frame to the destination node). The schedule configuration 360 can further include or define other parameters based on the data flow path or link requirements (for example, as defined by inputs 320, 330, 340, 354, 356) provided to the TSN scheduler 310.

As will be understood, the TSN scheduler 310 can be configured to select or determine the respective link 222a-m for each respective data flow 251, 252, 273 based on the data flow path or link requirements provided to the TSN scheduler 310, and to avoid contention or conflicts with other data flows 251, 252, 273. More specifically, the TSN scheduler 310 can be configured to schedule all data flows 251, 252, 273 (i.e., the transmission of all data frames on the set of links 222) and to avoid a conflict between any two or more data flows 251, 252, 273 on any link 222a-m. In aspects, the TSN scheduler 310 can be prevented from scheduling a particular data flow 251, 252, 273 that would result in a conflict. That is, in non-limiting aspects, the TSN scheduler 310 can be prevented from scheduling a particular data flow 251, 252, 273 on a particular link 222a-m at a particular time, in the event it is determined that such a schedule would result in a conflict. For example, in an instance, the TSN scheduler 310 can schedule a particular data flow, 251, 252, 273 on a particular link 222a-m at a particular time, and subsequently determine another unscheduled data flow would, if scheduled in accordance with the data flow path or link requirements 306, be in conflict with the scheduled particular data flow 251, 252, 273.

In some instances, for example in a complex network with a large number of end nodes 218, 220, 224, 226 and data flows 251, 252, 273, the network topology and data flow path or link requirements can result in a determination by the TSN scheduler 310 of a conflict for one or more data flows 251, 252, 273 on a particular link 222a-m at a particular time. In the event a conflict is determined or identified for one or more data flows 251, 252, 273 on one more links 222a-m, at one or more times, the TSN scheduler 310 can be prevented from scheduling the one or more data flows 251, 252, 273 having the conflict.

By defining certain device parameters in the input, aspects of the disclosure are enabled or otherwise allow for per-stream scheduling (per the TSN scheduler 310 and the schedule configuration 360) as opposed to per-class scheduling. Conventionally, in per class-scheduling, a set of data flows are treated as belonging to a single group or class of devices and are assigned to a single queue. Conversely, in per-stream scheduling, each data flow can be treated or scheduled individually and assigned to different queues. In one non-limiting example, per-stream scheduling can be based at least in part on a subset of the device parameter inputs 340, such as a set of scheduled traffic queues, a set of default open queues, a set of queues per port, the like, or a combination thereof.

In yet another non-limiting aspect of the disclosure, the system 300 can be included wherein the TSN schedule 310, the schedule configuration 360, or the like, can be determined, generated, or otherwise modified to include unique adjustment of the schedule configuration 360 before sending it to the end nodes and switching nodes. The unique adjustment can include, but is not limited to, a "gate open duration adjustment," defined by a transmission start time and transmission duration, in order to accommodate a device gating error. In one non-limiting example, the device gating error can be defined in part by the device parameter inputs 340.

Optionally, non-limiting aspects of the system 300 can be further included wherein, for example, not only can the schedule configuration 360 for operating the desired TSN be generated, but the system 300 can further operably enable the programming of the desired set or a subset of the TSN components 218, 220, 224, 226, 260 with the respective schedule configuration 360 information. For example, one or more switches 260 can be operably enabled to be programmed, updated, upgraded, or otherwise informed by the generated schedule configuration for that respective switch 260 configuration, and can further be programmed by that respective subset of the schedule configuration 360 information. The optional programming of the TSN devices is shown in dotted outline 370. In this sense, the system 300 can be enabled or adapted to not only generate the schedule configuration 360, but to implement that schedule configuration 360 within, at, or otherwise to, the set or a subset of the desired TSN components 218, 220, 224, 226, 260. As explained herein, the system 300 may be communicatively connected with the respective set or subset of the desired TSN components 218, 220, 224, 226, 260, such that the schedule configuration 360 aspects can be communicated to each of the respective set or subset of the desired TSN components 218, 220, 224, 226, 260. In one non-limiting example, aspects of the programming of the respective set or subset of the desired TSN components 218, 220, 224, 226, 260 can be defined at least in part by way of the parameter inputs 340, as explained herein.

In another non-limiting aspect of the system 300, the system 300 can generate the schedule configuration 360, as explained herein, but allow for or enable alternative programming or installation of the generated schedule configuration 360 at the respective devices. For example, the schedule configuration 360 can be communicated, programmed, installed, updated, or the like, to end nodes and switches via other methods including manual install. Stated another, non-limiting aspects of the disclosure can be included wherein at least a portion of the schedule configuration 360 can be delivered to each or a subset of respective devices, but the schedule configuration 360 can be loaded, enabled, operated, executed, installed, programmed, or the like, at a later, non-immediate time. In other aspects, the TSN scheduler 310 can comprise a separate or stand-alone module that is not communicatively coupled to the desire TSN. In such aspects, the schedule created by the TSN module 310 can be communicated or provided to the desired TSN by other loading protocols (e.g. ARINC615), other formats (e.g. ARINC665), or by manual entry or loading of data. In another aspect, the TSN scheduler 310 may be combined with another component in the system 300. For example, in non-limiting examples the control system 104 could include scheduler module 310.

Non-limiting aspects of the system 300 can be included wherein the schedule configuration 360 can additionally or alternatively be configured to provide a graphic display, such has the UI 350 or display 352, of a data transmission schedule for the desired TSN, or a portion thereof. The graphic display of the schedule configuration 360 or portion thereof can provide a user with a visual representation of all or a portion of the sequential data flows between a set of communicatively coupled end nodes with respect to time. The graphic display of the schedule configuration 360 can include or display information indicative each respective data flow of a set of data flows. The graphic display of the schedule configuration 360 can include or display information indicative of a start time and a duration of each respective data flow each data flow of a set of data flows with respect to each link in a path defined by the links. In aspects, the graphic display of the schedule configuration 360 can include or display information indicative of at least one of the corresponding pair of nodes for each link. In non-limiting aspects the graphic display of the schedule configuration 360 can be displayed in the form of a waterfall chart.

A waterfall chart is a visual tool that can be utilized as disclosed herein to analyze network schedules and resolve conflicts. Waterfall charts or diagrams can allow a user to visualize data that is generated cumulatively or sequentially to depict a data flow. A waterfall chart for the desired TSN or portion thereof can provide the user with a visual representation of all or a portion of the sequential data flows between a set of communicatively coupled end nodes with respect to time. In aspects, the waterfall chart can consist of a series of vertically arranged bars that extend horizontally across a timeline or time-axis. Each of the bars can represent a particular data flow between a pair of communicatively coupled nodes. The bars can be depicted in a vertically-arranged sequence indicative of a step-by-step sequence of the data flow through the desired TSN as the associated data frame is delivered to the intended end node destination.

Aspects of the disclosure can further include a method of generating the TSN schedule, for example, for the desired TSN, by way of implementing the system 300 described herein. For instance, the method can include defining a network topology of the desired TSN including at least a set of end nodes communicative connected by way of a set of switching nodes. In one example, this defined network topology can include the topology input 320. Non-limiting examples of the method can include defining a set of device parameters for each of the set of end nodes and each of the set of switching nodes of the desired TSN, such as the device parameter input 340, as described herein. In yet another non-limiting example, the method can include determining, by the TSN scheduler 310, a TSN schedule, such as the schedule configuration 360, for the desired TSN based on the defined network topology and the defined set of device parameters for each of the set of end nodes and each of the set of switching nodes. Yet another non-limiting example of the method can include generating a per-device configuration for each of the set of end nodes and each of the set of switching nodes of the desired TSN, based on the determined TSN schedule.

The method, and any other process described herein, can be performed using any suitable combination of hardware (e.g., circuit(s)), software or manual means. For example, a computer-readable storage medium can store thereon instructions that when executed by a machine result in performance according to any of the aspects described herein. In one or more aspects, the system 300 is conditioned to perform the method such that the system is a special-purpose element configured to perform operations not performable by a general-purpose computer or device. Software embodying these processes can be stored by any non-transitory tangible medium including a fixed disk, a floppy disk, a CD, a DVD, a Flash drive, or a magnetic tape. Examples of these processes will be described below, with respect to aspects of the system 300, but other aspects are not so limited.

The sequences described are for understanding only and is not meant to limit the methods or system 300 in any way, as it is understood that the portions of the method can proceed in a different logical order, additional or intervening portions can be included, or described portions of the method can be divided into multiple portions, or described portions of the method can be omitted without detracting from the described method.

Many other possible aspects and configurations in addition to that shown in the above figures are contemplated by the present disclosure. For example, one aspect of the disclosure contemplates the method can further include defining a set of data flows, such as the data flow input 330, defining communication pathways between the set of end nodes by way of the set of switching nodes. In another example, the method can be included wherein determining the TSN schedule is further based on the defined data flows. In yet another non-limiting aspect of the disclosure, the method can include generating a per-device configuration data file for each of the set of end nodes, each of the set of switching nodes, a subset thereof, or a combination thereof, of the desired TSN. In yet another non-limiting aspect of the disclosure, the method can include programming each of the set of end nodes and each of the set of switching nodes with the respective per-device configuration data file.

In yet another non-limiting aspect of the disclosure, the method can include at least one of updating each of the set of end nodes and each of the set of switching nodes, based on the respective per-device configuration data file, such that each of the set of end nodes and each of the set of switching nodes operate in accordance with the determined TSN schedule. In yet another non-limiting aspect of the disclosure, the method can include defining a set of device parameters by way of defining a per-device programming definition for each of the set of end nodes and each of the set of switching nodes. In yet another non-limiting aspect of the disclosure, the method can include defining a per-device programming definition including at least a subset of: a programming class definition, a login name, a login password, a programming port, a programming file structure, a programming file path, or a programming file format, for each of the set of end nodes and each of the set of switching nodes. In yet another non-limiting aspect of the disclosure, the method can be included wherein the per-device configuration data file for at least a subset of the end nodes or a subset of the switching nodes is instantiated at runtime of the respective subset of the end nodes or the subset of the switching nodes. In yet another non-limiting aspect of the disclosure, the method can be included wherein the defined set of device parameters include a set of TSN constraints for each of the set of end nodes or the set of switching nodes. In yet another non-limiting aspect of the disclosure, the method can be included, wherein the determining the TSN schedule is further based on the set of TSN constraints for each of the set of end nodes or the set of switching nodes.

The aspects disclosed herein provide a system 300 and method for scheduling data flows in time-sensitive networks. A technical effect is that the above described aspects enable the efficient scheduling of data flows in time sensitive networks. One advantage that can be realized in the above aspects is that the time required to determine a schedule for a time sensitive network can be reduced. Aspects of the disclosure can be included wherein a "rich" or detailed topology model, device parameters, data flows, or the like, can capture a number of non-standard device and link characteristics needed for generation of a feasible TSN schedule configuration or TSN schedule feasible solution that can be realized on actual hardware. In this sense, the rich topology information captures physical or device attributes, including but not limited to bridge delay, default open queue state, worst-case errors, supported yang models, hardware limits, or the like. Additionally, aspects of the disclosure can generate a TSN schedule configuration that creates feasible communication paths or data flows based on the relevant attributes of each link and device defined in the data inputs. Another advantage of the disclosure can include generating a TSN schedule for a desired TSN where generation of the TSN model "on-the-fly" (e.g. during or at runtime) is not feasible.

To the extent not already described, the different features and structures of the various aspects can be used in combination with each other as desired. That one feature cannot be illustrated in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

This written description uses examples to disclose aspects of the disclosure, including the best mode, and also to enable any person skilled in the art to practice aspects of the disclosure, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Various characteristics, aspects and advantages of the present disclosure can also be embodied in any permutation of aspects of the disclosure, including but not limited to the following technical solutions as defined in the enumerated aspects:

A method of generating a time-sensitive network (TSN) schedule for a desired TSN, comprising defining a network topology of the desired TSN including at least a set of end nodes communicatively connected by way of a set of switching nodes, defining a set of device parameters for each of the set of end nodes and each of the set of switching nodes of the desired TSN, determining, by a TSN scheduler, a TSN schedule for the desired TSN based on the defined network topology and at least a subset of the defined set of device parameters for each of the set of end nodes and each of the set of switching nodes, and generating a per-device configuration for each of the set of end nodes and each of the set of switching nodes of the desired TSN, based on the determined TSN schedule.

The method of any preceding clause, further comprising defining a set of data flows defining communication pathways between the set of end nodes by way of the set of switching nodes.

The method of any preceding clause, wherein determining the TSN schedule is further based on the defined data flows.

The method of any preceding clause, wherein generating the per-device configuration further comprises generating a per-device configuration data file for each of the set of end nodes and each of the set of switching nodes of the desired TSN.

The method of any preceding clause, further comprising programming each of the set of end nodes and each of the set of switching nodes with the respective per-device configuration data.

The method of any preceding clause, wherein programming further comprises at least one of updating each of the set of end nodes and each of the set of switching nodes, based on the respective per-device configuration data, such that each of the set of end nodes and each of the set of switching nodes operate in accordance with the determined TSN schedule.

The method of any preceding clause, wherein defining a set of device parameters further comprises defining a per-device programming definition for each of the set of end nodes and each of the set of switching nodes.

The method of any preceding clause, wherein defining a per-device programming definition further comprises at least a subset of: a programming class definition, a login name, a login password, a programming port, a programming file structure, a programming file path, or a programming file format, for each of the set of end nodes and each of the set of switching nodes.

The method of any preceding clause, wherein the per-device configuration data file for at least a subset of the end nodes or a subset of the switching nodes is instantiated at runtime of the respective subset of the end nodes or the subset of the switching nodes.

The method of any preceding clause, wherein the defined set of device parameters include a set of TSN scheduling constraints for each of the set of end nodes or the set of switching nodes.

The method of any preceding clause, wherein the determining the TSN schedule is further based on the set of TSN constraints for each of the set of end nodes or the set of switching nodes.

A system for generating a time-sensitive network (TSN) schedule for a desired TSN, the system including a set of topology input data, stored in memory, defining an arrangement of the desired TSN including at least a set of end nodes communicative connected by way of a set of switching nodes, a set of data flow input data, stored in memory, defining communication pathways between the set of end nodes by way of the set of switching nodes, a set of device parameter input data, stored in memory, for each of the set of end nodes and each of the set of switching nodes of the desired TSN, and a TSN scheduler, configured to determine a TSN schedule for the desired TSN based on the set of topology input data, the set of data flow input data, and the set of device parameter input data, for each of the set of end nodes and each of the set of switching nodes, and generate a per-device configuration for each of the set of end nodes and each of the set of switching nodes of the desired TSN, based on the determined TSN schedule, wherein each of the set of end nodes and each of the set of switching nodes of the desired TSN are operable in accordance with the respective per-device configuration.

The system of any preceding clause, wherein each of the set of end nodes and each of the set of switching nodes are programmed with the respective per-device configuration.

The system of any preceding clause, wherein the TSN scheduler is further configured to generate a per-device configuration data file, and wherein each per-device configuration data file is provided to each of the respective set of end nodes and each of the respective set of switching nodes.

The system of any preceding clause, wherein the set of device parameter input data defines a per-device programming definition for each of the set of end nodes and each of the set of switching nodes.

The system of any preceding clause, wherein the per-device programming definition further comprises at least a subset of: a programming class definition, a login name, a login password, a programming port, a programming file structure, a programming file path, or a programming file format, for each of the set of end nodes and each of the set of switching nodes.

The system of any preceding clause, wherein the per-device configuration data file for at least a subset of the end nodes or a subset of the switching nodes is instantiated at runtime of the respective subset of the end nodes or the subset of the switching nodes.

The system of any preceding clause, wherein the set of device parameter input data includes a set of TSN constraints for each of the set of end nodes or the set of switching nodes, and wherein the TSN scheduler is further configured to determine the TSN schedule is based on the set of TSN constraints for each of the set of end nodes or the set of switching nodes.

The system of any preceding clause, further comprising a user interface adapted to receive at least one user input.

The system of any preceding clause, wherein the at least one user input includes a suggested cycle time, and wherein the TSN scheduler is further configured to determine the TSN schedule by prioritizing the suggested cycle time.

What is claimed is:

1. A method of generating a time-sensitive network (TSN) schedule for a desired TSN, comprising:
    defining a network topology of the desired TSN including at least a set of end nodes communicatively connected by way of a set of switching nodes;
    defining a set of device parameters for each of the set of end nodes and each of the set of switching nodes of the desired TSN, the set of device parameters including at least one scheduling metric for each of the respective set of end nodes and each of the respective set of switching nodes of the desired TSN;
    receiving, by a TSN scheduler, the defined network topology and at least a subset of the defined set of device parameters for each of the set of end nodes and each of the set of switching nodes;
    determining, by the TSN scheduler in a contiguous scheduling mode, a TSN schedule for the desired TSN based on the defined network topology and at least a subset of the defined set of device parameters for each of the set of end nodes and each of the set of switching nodes;
    generating, by the TSN scheduler, a per-device configuration for each of the set of end nodes, based on the TSN schedule, and
    programming each of the set of end nodes and each of the set of switching nodes with respective per-device configuration data; and
    wherein when the contiguous scheduling mode cannot be completed, the TSN scheduler is configured to default to a non-contiguous scheduling mode.

2. The method of claim 1 wherein defining the set of device parameters includes at least one limiting characteristic associated with the at least one scheduling metric for at least a subset of the end nodes or a subset of the switching nodes.

3. The method of claim 2 wherein defining the set of device parameters includes at least one limiting characteristic associated with the at least one scheduling metric for each of the set of the end nodes and each of the set of the switching nodes.

4. The method of claim 2 wherein defining the set of device parameters includes at least one limiting characteristic associated with a worst-case scheduling metric for at least a subset of the end nodes or a subset of the switching nodes.

5. The method of claim 4 wherein defining the set of device parameters includes at least one limiting characteristic associated with a worst-case scheduling performance metric for at least a subset of the end nodes or a subset of the switching nodes.

6. The method of claim 5 wherein defining the set of device parameters includes at least one limiting characteristic associated with a worst-case scheduling performance metric for each of the set of the end nodes and each of the set of the switching nodes.

7. The method of claim 1 wherein defining a set of device parameters for each of the set of end nodes and each of the set of switching nodes of the desired TSN, includes defining at least one of a maximum cycle time supported and a maximum gate interval duration supported.

8. The method of claim 1 wherein defining the set of device parameters includes at least one sub-optimal limiting characteristic associated with the at least one scheduling metric for at least a subset of the end nodes or a subset of the switching nodes.

9. The method of claim 1 wherein defining a set of device parameters for each of the set of end nodes and each of the set of switching nodes of the desired TSN, includes defining at least a first device parameter for a first end node of the set of end nodes, and defining at least a second device parameter for a second end node of the set of end nodes, wherein the first device parameter is different from the second device parameter, and wherein the first end node is different from the second end node.

10. The method of claim 1 wherein defining a set of device parameters for each of the set of end nodes and each of the set of switching nodes of the desired TSN, includes defining at least a first device parameter for a first switching node of the set of switching nodes, and defining at least a second device parameter for a second switching node of the set of switching nodes, wherein the first device parameter is different from the second device parameter, and wherein the first switching node is different from the second switching node.

11. The method of claim 1 wherein the at least a subset of the defined set of device parameters for each of the set of end nodes and each of the set of switching nodes includes a time synchronization error of each of the set of switching nodes.

* * * * *